US00RE43261E

(19) United States
(12) Reissued Patent
Utz

(10) Patent Number: US RE43,261 E
(45) Date of Reissued Patent: Mar. 27, 2012

(54) METHOD OF MAKING A LABEL SHEET

(75) Inventor: Martin Utz, Gmund (DE)

(73) Assignee: Avery Dennison Corporation, Pasadena, CA (US)

(21) Appl. No.: 13/006,884

(22) Filed: Jan. 14, 2011

Related U.S. Patent Documents

Reissue of:
(64) Patent No.: 7,695,584
Issued: Apr. 13, 2010
Appl. No.: 12/324,264
Filed: Nov. 26, 2008

U.S. Applications:
(62) Division of application No. 11/298,144, filed on Dec. 9, 2005, now Pat. No. 7,459,193.

(30) Foreign Application Priority Data

Jun. 11, 2003 (DE) ..... 103 26 298
Jun. 11, 2004 (EP) ..... PCT/EP2004/006324

(51) Int. Cl.
*B31D 1/02* (2006.01)
*B32B 38/04* (2006.01)
*B32B 38/10* (2006.01)

(52) U.S. Cl. ..... 156/248; 156/249; 156/250

(58) Field of Classification Search ..... 156/248–250, 156/252, 253; 428/40.1, 43, 41.8, 42.3
See application file for complete search history.

(56) References Cited

U.S. PATENT DOCUMENTS 3,854,229 A 12/1974 Morgan
4,446,183 A 5/1984 Savagian
5,192,612 A 3/1993 Otter et al.
(Continued)

FOREIGN PATENT DOCUMENTS

DE 1296363 5/1969
(Continued)

OTHER PUBLICATIONS

Office Action dated Jul. 2, 2004 from corresponding German Application No. 10326298.9 filed Jun. 11, 2003.

(Continued)

*Primary Examiner* — Sing P Chan
(74) *Attorney, Agent, or Firm* — Rankin, Hill & Clark LLP

(57) ABSTRACT

A label sheet label sheet includes a transparent film support material, a pressure-sensitive adhesive layer, a release layer, a printable layer, one or more first detachment lines, and one or more second detachment lines. The transparent film support material has an inner surface and an outer surface. The pressure-sensitive adhesive layer is disposed over the transparent film support material inner surface. The release layer is disposed over the pressure-sensitive adhesive layer. The printable layer is disposed over the pressure-sensitive adhesive layer, and includes an inner surface facing the release layer and an opposing outer surface. The outer surface exhibits a roughness of 4 to 50 μm (DIN 4768). The one or more first detachment lines extend from the printable layer outer surface and through the printable layer and the release layer, to thereby form a first sub-region. The one or more second detachment lines extend from the support material outer surface and through the support material and the pressure-sensitive adhesive layer, to thereby form a second sub-region that is larger than the first sub-region.

10 Claims, 1 Drawing Sheet

U.S. PATENT DOCUMENTS

| | | | |
|---|---|---|---|
| 5,346,766 | A | 9/1994 | Otter et al. |
| 5,487,929 | A | 1/1996 | Rusincovitch, Jr. et al. |
| 5,662,976 | A | 9/1997 | Popat et al. |
| 5,866,249 | A | 2/1999 | Yarusso et al. |
| 6,159,570 | A | 12/2000 | Ulrich et al. |
| 6,517,921 | B2 | 2/2003 | Ulrich et al. |
| 6,521,312 | B1 | 2/2003 | Keiser |
| 2002/0011306 | A1 | 1/2002 | Hannington et al. |

FOREIGN PATENT DOCUMENTS

| | | |
|---|---|---|
| DE | 4003129 | 8/1990 |
| DE | 19724648 | 12/1998 |
| DE | 10326298.9 | 1/2005 |
| JP | 2003150058 | 5/2003 |
| WO | 2004-109408 | 12/2004 |
| WO | PCT/EP2004/006324 | 12/2004 |

OTHER PUBLICATIONS

Amendment dated Jan. 17, 2005 from corresponding German Application No. 10326298.9 filed Jun. 11, 2003.

Intent to Grant dated Oct. 15, 2007 from corresponding German Application No. 10326298.9 filed Jun. 11, 2003.

Written Opinion dated Feb. 14, 2005 from corresponding International Application No. PCT/EP04/006324 filed Jun. 11, 2004.

International Search Report dated Feb. 16, 2005 from corresponding International Application No. PCT/EP04/006324 filed Jun. 11, 2004.

International Preliminary Report on Patentability dated Aug. 2, 2005 from corresponding International Application No. PCT/EP04/006324 filed Jun. 11, 2004.

Intent to Grant dated Jul. 20, 2006 from corresponding European Application No. 04739814.4 filed Jun. 11, 2004.

Amendment dated Dec. 7, 2005 from corresponding Canadian Application No. 2528682 filed Jun. 11, 2004.

Amendment dated Jun. 23, 2005 from corresponding European Application No. 04739814.4 filed Jun. 11, 2004.

Notice of Intent to Grant dated Jan. 2, 2007 from corresponding European Application No. 04739814.4 filed Jun. 11, 2004.

Amendment dated Feb. 1, 2008, Substituting Allowed EP Claims, from corresponding Mexican Application No. PA/a/2005/013436 filed Jun. 11, 2004.

Office Action dated Oct. 16, 2007 from prior U.S. Appl. No. 11/298,144, filed Jun. 11, 2004.

Amendment dated Jan. 14, 2008 from prior U.S. Appl. No. 11/298,144, filed Jun. 11, 2004.

Notice of Allowance dated Apr. 4, 2008 from prior U.S. Appl. No. 11/298,144, filed Jun. 11, 2004.

Notice of Allowance dated Aug. 1, 2008 from prior U.S. Appl. No. 11/298,144, filed Jun. 11, 2004.

Notice of Allowance dated Feb. 22, 2008 from corresponding Mexican Application No. PA/a/2005/013436 filed Jun. 11, 2004.

International Preliminary Report on Patentability dated Aug. 2, 2005 from corresponding International Application No. PCT/EP04/006324 filed Jan. 11, 2004.

Information Disclosure Statement dated Dec. 9, 2005 from prior U.S. Appl. No. 11/298,144, filed Jun. 11, 2004.

Information Disclosure Statement dated Jun. 19, 2007 from prior U.S. Appl. No. 11/298,144, filed Jun. 11, 2004.

Request for Continued Examination and Information Disclosure Statement dated Jul. 2, 2008 from prior U.S. Appl. No. 11/298,144, filed Jun. 11, 2004.

Amendment dated Feb. 1, 2008 from corresponding Mexican Application No. PA/a/2005/013436 filed Jun. 11, 2004.

Amendment dated Jun. 12, 2005 from corresponding European Application No. 04739814.4 filed Jun. 11, 2004.

Notice of Intent to Grant dated Jan. 2, 2007 from corresponding EP Application No. 04739814.4.

METHOD OF MAKING A LABEL SHEET

Matter enclosed in heavy brackets [ ] appears in the original patent but forms no part of this reissue specification; matter printed in italics indicates the additions made by reissue.

CROSS-REFERENCE TO RELATED APPLICATIONS

This application claims priority to U.S. patent application Ser. No. 11/298,144 entitled "LABEL SHEET", filed Dec. 9, 2005 now U.S. Pat. No. 7,459,193, which claims priority to PCT Patent Application No. PCT/EP2004/006324 entitled "A LABEL SHEET", filed Jun. 11, 2004, which claims priority to German Patent Application No. DE 103 26 298.9, filed on Jun. 11, 2003. All of these documents are incorporated herein by reference.

TECHNICAL FIELD

The invention relates to a label sheet, a label produced therefrom and a method of producing the label from the label sheet.

BACKGROUND

Inkjet desktop and laser printers are widely used to individually print paper materials. These printers do, however, suffer from the drawback that the inks may fade with time and may offer only limited resistance to water, dirt, chemicals, UV radiation, and mechanical impact. As a result, such printed materials may be unsuitable for long-term applications either indoors or outdoors. Moreover, if exposed to air for a fairly long period of time, paper labels can become discolored, with the paper typically turning yellow.

To make materials, such as labels that have been printed by means of an inkjet desktop or laser printer, suitable for long-term applications, methods are being sought that improve the resistance of the label and its imprint with respect to the aforementioned possible influences.

To enhance a label's resistance to water, special-purpose inkjet coatings can be applied to paper. Such coatings may also simultaneously improve the quality of printing. Such an approach, however may not achieve a degree of water resistance that would permit use outdoors. Moreover, light resistance is typically not enhanced by the special-purpose coating. In consequence, an indoor or outdoor application which lasts several months usually causes the inks to fade to such an extent that it may no longer be possible to read or to discern the indicia printed thereon.

The resistance of materials can also be improved by lamination using a film. For example, DE 1 296 363 describes a process in which a sheet of paper, while being heated, is bonded to a flexible, tough and transparent plastic film by means of an adhesive coating on that side of the plastic film which faces towards the sheet of paper. This kind of plastic film is resistant to solvents, such as acetone, carbon tetrachloride and heptane, and is resistant to degradation when exposed to water. However, the process can suffer from the disadvantage that the lamination technique can be relatively complicated and the plastic coating typically first has to be activated at 50° C. to 85° C. before bonding occurs.

In addition, it is known that pigmented inks should be used in the case of industrial printers in order to enhance the resistance of the inks to light. Nonetheless, the use of such pigmented inks, apart from the color black, has so far not been feasible in inkjet desktop printers.

Furthermore, DE 40 03 129 describes a styrene-based film that contains a benzophenone type or benzotriazole type ultraviolet (UV) absorber and/or a sterically hindered amine type light stabilizer. The products are free of fish-eye gel, do not discolor in conditions of humid heat, can be readily printed and are resistant to weathering. Nevertheless, there is the disadvantage that styrene-based films typically can be printed only by using a special-purpose printing ink for polystyrene, and not by using commercially available inkjet desktop or laser printers.

It is, moreover, known in principle that a label's resistance can be improved by lamination using a transparent film. Nevertheless, this kind of lamination is typically relatively complicated because the label and the film are present as separate sheets or rolls and the film is typically tailored to the size of the label in an additional procedural stage. Since, moreover, lamination may take place on the basis of a visual estimation, it is frequently the case that the label is bonded lopsidedly with the film, which detracts from the appearance of the resultant laminated label. Typically, it is not possible to reposition the film because once bonded with the surface of a paper label, the adhesive may stick tightly and inhibit the film from being peeled off again. Additionally, large-format labels, in particular, suffer from the problem that during bonding, air bubbles or pockets may form between the label and the laminating film; such air pockets likewise can cause the label to look unattractive.

To permit a label to be laminated with a film in as positionally accurate a manner as possible, the Nichiban company developed a label sheet in which the label and the transparent laminating film are integrated within a single sheet. This label sheet comprises the following layers: laminating film, pressure-sensitive adhesive layer, release layer, paper layer. The label sheet further comprises punch lines, by means of which sub-regions the size of a label are formed. The sub-regions that are formed in the paper layer, including the release layer, are smaller than the sub-regions formed in the laminating film, including the pressure-sensitive adhesive layer, the latter protruding over the former at the edges. To laminate a label, the sub-region corresponding to the label is removed from the paper layer and, having been turned upside down, re-affixed into the resultant window onto the pressure-sensitive adhesive layer, thereby causing the printable layer to be bonded to the pressure-sensitive adhesive layer. Afterwards, the sub-region of the laminating film, together with the stuck-on label, is removed from the label sheet. The laminating film's protruding edges, which project over the stuck-on label, cause the composite to be in turn affixed to any kind of object.

Nichiban's above-described label sheet, while generally useful, does suffer from the drawback that typically only relatively small labels can be bonded effectively in this way. Larger labels are faced with the problem that, during lamination, air pockets may be trapped between the label and the laminating film, which can detract from the appearance of the resultant laminated label. Furthermore, it is typically not possible to re-adjust the position of a paper label once it has been stuck on.

U.S. Patent Application Publication No. 2002/0011306 describes adhesive labels which provide areas of non-adhesive material within the adhesive layer to allow the removal of entrapped air pockets. For the same reason, the adhesive layer may be provided with a Sheffield-roughness of at least 10 units or at least 70 units or at least 150 units.

German Patent Application Publication DE 197 24 648 A1 describes a self-adhesive area-measured product comprising a substrate, a non-stick coating on the upper side of the substrate, and an adhesive coating on the underside of the substrate, and being characterized in that the adhesive coating is present in the form of a pattern and that the upper side of the substrate having the non-stick coating has a roughness of at least 1 μm (measured according to ISO 8791-4).

Hence, there is a need for a label sheet that can be used to laminate labels with a film in a simple, effective, and accurate manner, such that the labels are made resistant, for example to light, UV radiation, ozone, dirt, water, chemicals and mechanical impact, and are thus suited to long-term application both indoors and outdoors. There is additionally a need for labels that are relatively free of entrapped air pockets between the laminating film and the printable layer, particularly whenever large-format A4 or A3 labels are used. There is also a need to be able to reposition the laminating film if so desired. The present invention addresses one or more of these needs.

BRIEF SUMMARY

In one embodiment, and by way of example only, a label sheet includes a transparent film support material, a pressure-sensitive adhesive layer, a release layer, a printable layer, one or more first detachment lines, and one or more second detachment lines. The transparent film support material has an inner surface and an outer surface. The pressure-sensitive adhesive layer is disposed over the transparent film support material inner surface. The release layer is disposed over the pressure-sensitive adhesive layer. The printable layer is disposed over the pressure-sensitive adhesive layer, and includes an inner surface facing the release layer and an opposing outer surface. The outer surface exhibits a roughness of 4 μm to 50 μm (DIN 4768). The one or more first detachment lines extend from the printable layer outer surface and through the printable layer and the release layer, to thereby form a first sub-region. The one or more second detachment lines extend from the support material outer surface and through the support material and the pressure-sensitive adhesive layer, to thereby form a second sub-region that is larger than the first sub-region.

DETAILED DESCRIPTION OF A PREFERRED EMBODIMENT

Figure 1:
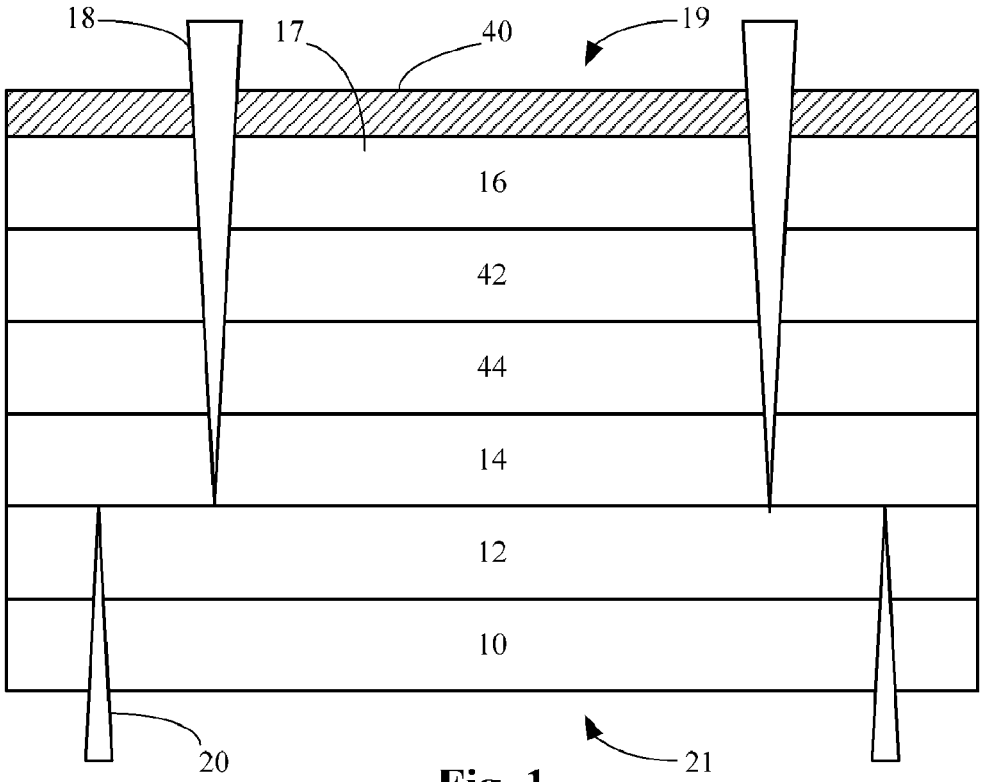
FIG. 1 represents a label sheet, the printable layer of which has a porous upper side.

FIG. 1 depicts an exemplary embodiment of a label sheet according to the invention; this label sheet has a transparent backing material (10), a pressure-sensitive adhesive layer (12), a release layer (14), a PET film (44), a pressure-sensitive adhesive layer (42) and a printable layer (16). A porous coating (40) that exhibits a roughness in the range of 4 μm to 50 μm (DIN 4768) is applied to the upper side (17) of the printable layer. The label sheet comprises first and second detachment lines (18, 20), thereby forming partial areas (19, 21). The first partial area includes the release layer (14), the PET film (44), the pressure-sensitive adhesive layer (42), and the printable layer (16) coated with the porous layer (40), and the second partial area (21) includes the pressure-sensitive adhesive layer (12) and the transparent film (10). The second partial area (21) is larger than the first partial area (19). A repositionable adhesive is preferably used as the adhesive in the pressure-sensitive adhesive layer (12).

During the lamination step, the first partial region (19) is cut out of the label sheet and, having been turned upside down, is bonded into the resultant window onto the uncovered pressure-sensitive adhesive layer (12), with the result that the porous layer (40) now directly adjoins the pressure-sensitive adhesive layer (12). The roughness of the porous layer (40) gives rise to non-adhesive regions or channels between the porous layer (40) and the pressure-sensitive adhesive layer (12), thereby removing entrapped air pockets.

Figure 2:
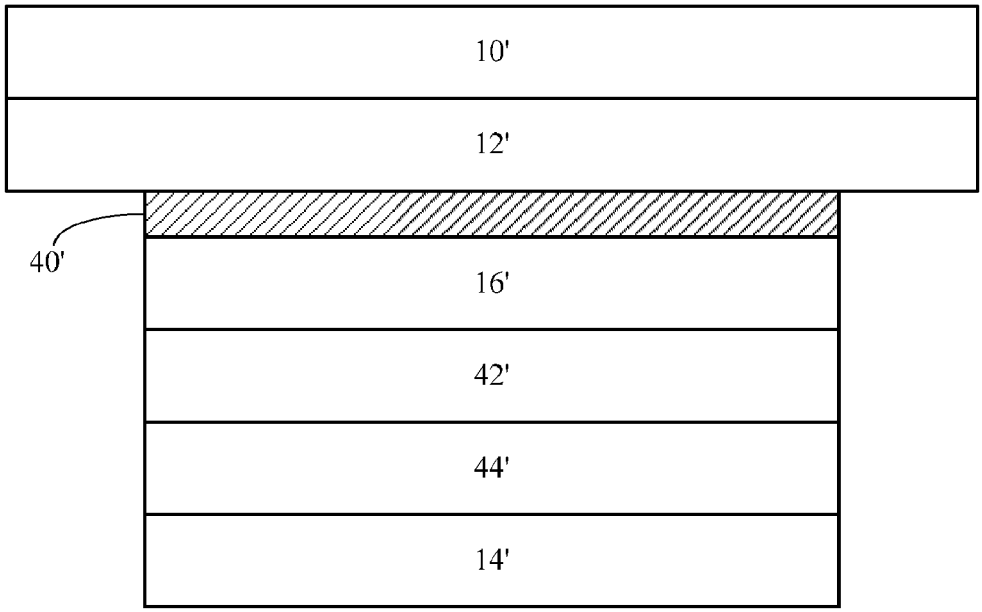
FIG. 2 represents a laminated label produced from the label sheet of FIG. 1.

Separating the thus bonded partial areas (19, 21) from the label sheet produces a label whose structure is depicted in FIG. 2: transparent laminating film (10'), pressure-sensitive adhesive layer (12'), porous coating (40'), printable layer (16'), pressure-sensitive adhesive layer (42'), PET film (44'), release layer (14').

Instead of a porous coating (40), use can also be made of a printable layer (16) that already has a rough surface, for example a paper which naturally has a roughness in the range indicated above or a roughness produced by embossing.

The label sheet may be of any one of numerous sizes, though it preferably has the size of an A4 or A3 format.

The transparent film in the label sheet preferably has the function of a backing material and acts as a protective laminate within the label that can be produced from the label sheet, thereby protecting the layers located therebelow from moisture.

It is noted that, after lamination of the printable layer (16) with the transparent film (10), non-adhesive regions are formed between the laminating film and the printable layer either by applying the pressure-sensitive adhesive (12) in the form of a pattern or by using a printable layer which has a roughness of 4 μm to 50 μm (DIN 4768) on its upper side. These non-adhesive regions are able to move any air bubbles that are inevitably trapped between the laminating film and printable layer during the laminating stage towards the edges of the laminate, for example by manually smoothing them out.

Any one of numerous known films can be used as the transparent backing material (10). To enable the label sheet to be printed using a laser printer, the transparent film should be heat-resistant, such as polymethyl pentene (TPX®, Mitsui Chemicals, Inc., Japan) or polyethylene terephthalate (PET) films. A PET film is particularly preferred for use as a transparent film. The transparent film preferably has a thickness of 26 μm to 200 μm, with particular preference for 50 μm.

The transparent film may include known HALS compounds ("hindered amine light stabilizers") for the purpose of stabilization. In a particularly preferred embodiment, moreover, the transparent film is UV-stabilized, i.e. it contains one or more UV-absorbing components. Such UV-absorbing components are known to the person skilled in the art and may, for example, be benzophenone or benzotriazole compounds.

The term "printable layer" is defined as a layer that can be printed using an inkjet desktop printer or laser printer. The printable layer is preferably an uncoated paper, an uncoated cardboard or a paper or cardboard coated with an inkjet or laser printer coating. The paper or cardboard preferably has a grammage of 70 g/m$^2$ to 200 g/m$^2$.

The release layer (14) is located between the printable layer (16) and the pressure-sensitive adhesive layer (12). The release layer is preferably a silicone layer. To stop the print quality from being impaired due to the migration of silicone while the release layer (14) is being applied to the back of the printable layer (16), it is preferable to bond the underside of the printable layer (16) to the PET film (44). Then, the PET film (44) is coated with the release layer (14). Alternatively, it is possible to use a pre-siliconized PET film as well, i.e. one that is coated with a release layer.

The detachment lines (18, 20) are applied such as to form the sub-regions (19, 21). These sub-regions (19, 21) may be polygonal, e.g. quadratic or rectangular, round or oval. Preferably, the second detachment line (20) protrudes over the first detachment line (18) preferably by 5% to 50%, with particular preference for 10% to 30%. This means that the second sub-regions (21) are larger than the first sub-regions (19). The detachment lines (18, 20) may be a sectional, punched or perforated line. Particularly in the case of the second sub-regions (21) the detachment lines (20) may also correspond to the outer edges (22, 24) of the label sheet. If all the second detachment lines (20) correspond to the outer edges (22, 24) of the label sheet, the second partial area (21) is the same size as the label sheet itself. In accordance with a preferred embodiment, the second sub-region (21) has the size of an A3 or A4 format. The first sub-region (19) is then 10% to 30% smaller.

The label sheet as specified by the invention comprises a layer of pressure-sensitive adhesive. In certain applications, the adhesive may also be of the heat-activated type. The pressure-sensitive adhesive layer usually has a thickness of 10 μm to 125 μm, preferably approx. 25 μm to approx. 75 μm or 10 μm to approx. 50 μm, the specific thickness being dependent on the actual application. In one embodiment, the weight of the pressure-sensitive adhesive coating ranges from approx. 10 g/m$^2$ to approx. 50 g/m$^2$ and in a preferred embodiment from approx. 20 g/m$^2$ to 35 g/m$^2$. The pressure-sensitive adhesive may be any known pressure-sensitive adhesive. This type of adhesive includes rubber-based pressure-sensitive adhesives, acrylic pressure-sensitive adhesives, vinyl ether pressure-sensitive adhesives, silicone adhesives and mixtures of two or more thereof. Such pressure-sensitive adhesive materials are described in "Adhesion and Bonding", Encyclopaedia of Polymer Science and Engineering, Vol. 1, pages 476-576, Interscience Publishers, 2nd edition, 1985. Suitable pressure-sensitive adhesive materials contain a polymer as a principal constituent, for instance acrylic type polymers, block copolymers, natural or recovered rubbers, styrene butadiene rubbers, random ethylene and vinyl acetate copolymers, ethylene vinyl acrylic terpolymers, polyisobutylene poly(vinyl ethers) etc. The pressure-sensitive adhesive materials are typically characterized by their glass transition temperatures ranging from approx. −70° C. to approx. +10° C.

In addition to the aforementioned resins, other materials may be present in the pressure-sensitive adhesive materials. These include antioxidants, filler materials, pigments, waxes etc. The adhesive materials may contain a mixture of solid tackifying resins and liquid tackifying resins. Particularly preferred pressure-sensitive adhesives are described in U.S. Pat. No. 5,192,612 and U.S. Pat. No. 5,346,766.

Particular preference is given to the use of an adhesive which does not unfold its full adhesive strength until after 1 min to 5 min, so as to enable the affixed partial area of the printable/printed layer to be repositioned. This type of adhesive includes low-temperature adhesives and is known in principle to the person skilled in the art.

The pressure-sensitive adhesive can be applied by using standard coating techniques, such as curtain coating, gravure coating, reverse gravure printing, offset gravure printing, roller coating printing, brushing, knife-over-roll coating, airbrush roller coating, metering-roller coating, reverse roll coating, roller coating with bottom-action doctor blade, immersion, jet coating, spraying and the like. The use of these coating techniques is well known and can be performed effectively by a person skilled in the art. Further information on coating techniques is to be found in "Modern Coating and Drying Technology", by Edward Cohen and Edgar Gutoff, published by VCH Verlag, 1992.

In accordance with a preferred embodiment, conventional UV blockers may be present in the pressure-sensitive adhesive layer.

The light-absorbing components contained in the transparent film and/or the pressure-sensitive adhesive layer and/or the non-adhesive material bring about a substantial improvement of the light resistance of an imprint that was applied to the printable layer by means of an inkjet desktop printer or laser printer.

An alternative embodiment of the label sheet according to the invention is characterized in that the pressure-sensitive adhesive layer exists in the form of a pattern. The pattern-like coating of pressure-sensitive adhesive itself gives rise to non-adhesive regions, i.e. non-adhesive channels. The pressure-sensitive adhesive is present in the form of dots or lines, whereby attention should be paid to the fact that channels which extend as far as the edge of the sub-regions, i.e. as far as the detachment lines, are formed, without any adhesive, by the pattern, so as to ensure the repositioning of any air pockets that might have been trapped between the printable layer and the transparent film after lamination.

The resultant patterns are referred to as dot patterns, line patterns (also designated as dash patterns) or net-like patterns. Dot or line patterns are preferred.

The above-described type of pressure-sensitive adhesive is used as a pressure-sensitive adhesive. In this case, as well, particular preference is given to the use of an adhesive that permits repositioning. Furthermore, adhesive dispersions such as aqueous dispersions, organisols or plastisols can be used. Dispersions that have a solids content of at least 45% by weight are taken as a basis. (Meth)acrylate esters having $C_4$-$C_{12}$ alkyl radicals are preferably chosen as a dispersion for application of the pressure-sensitive adhesive. Amounts of acrylonitrile or acrylamides as well as crosslinker additives such as N-methylol acrylamide or glycidyl methacrylate, in combination with hydroxyl-group carrying or polyfunctional (meth)acrylate esters, for instance butanediol bis-acrylate, are able to enhance the cohesion or stability of the dispersion of a plastisol or organisol. Part of the methacrylate ester can, moreover, be replaced by copolymerizable compounds such as vinyl acetate or vinyl propionate. In addition, small amounts (up to approx. 12%) of (meth)acrylic acid and/or other copolymerizable acids such as itaconic acid, fumaric acid or maleic acid can be included in the polymer. Furthermore, one or more known UV blockers can be added to the pressure-sensitive adhesive.

The pressure-sensitive adhesive pattern can be applied by way of flexographic, screen or gravure printing. In the case of screen printing, by means of which a dot pattern is preferably produced, it is possible to use a flat screen or a revolving screen (rotary screen printing).

The pressure-sensitive adhesive is present in a pattern of 12 lines/cm substrate to 80 lines/cm substrate, particularly 24 lines/cm substrate to 50 lines/cm substrate. It is well known that the shape of the pattern elements, such as diameter and height of the dots or lines, and hence the adhesive forces are chiefly influenced by the following factors: type of coating process, parameters affecting the coating process (e.g. mesh size and depth in the case of screen printing) and any physical parameters affecting the compound that is applied (e.g. hot-melt adhesive or dispersion adhesive), particularly its viscosity and thixotropy.

In this embodiment, the pressure-sensitive adhesive is preferably applied with a grammage of 5 g/m$^2$ to 20 g/m$^2$ (particularly 8 g/m$^2$ to 15 g/m$^2$).

The roughness of the printable layer can be generated mechanically, for example by embossing, or by chemically modifying the surface of the printable layer, for example by applying a porous layer. Inkjet or "microporous" coatings that are known to the skilled person can be mentioned here as examples of such a porous coating.

In accordance with a further alternative embodiment of the label sheet according to the invention, the upper side of the printable layer has a roughness of 4 μm to 50 μm (DIN 4768), preferably 10 μm to 25 μm. If the upper side of the printable layer has a roughness in the above-mentioned range, non-adhesive regions/channels are produced between the printable layer and the pressure-sensitive adhesive layer during lamination whenever the rough surface is bonded to the pressure-sensitive adhesive layer. In turn, these non-adhesive regions/channels cause any entrapped air pockets to be smoothed out towards the edges.

It is self-evident that the aforementioned embodiments can be combined together as well, for example, that the printable material is roughened on both the upper and lower sides.

If the label sheet depicted in FIG. 1 and described above is used, a label can be made by means of the following technique:

(a) separating the first partial area (19) from the label sheet, (b) affixing the separated first partial area (19) to the pressure-sensitive adhesive layer (12) at the same site in the label sheet at which the first partial area (19) was previously separated, (c) separating the label comprising the second partial area (21) and the first partial area (19) from the label sheet.

In the above-described method of producing the label, the transparent film (14) simultaneously fulfills the function of a backing material in the label sheet. The printable layer (16) and transparent film (14) are therefore integrated within a single label sheet. This embodiment is advantageous because handling is very simple and it is not necessary to use two separate sheets, a label sheet and a laminating film sheet, when the label is being made. Furthermore, after the first partial area (19) has been separated, the resultant window gives rise in step (b) to a centering aid, which enables the printable layer (16) to be laminated with the film (10) in a positionally accurate manner. Moreover, any unwanted air pockets can be removed as a result of the application of the pressure-sensitive adhesive layer (12) in the shape of a pattern or as a result of the use of a printable layer (16) that exhibits a roughness of 4 μm to 50 μm (DIN 4768) on its upper side. This is particularly preferable whenever large-format laminated labels are to be produced, for example with A4 or A3 format.

Specific structural designs for the label sheet, in which use is made of a printable layer (16) that has a rough surface, which as a result of the coating (40), are described below.

A structure for signs preferably comprises layers in the following sequence:

transparent film: 50-μm PET film
permanent repositionable adhesive, coated all over
release layer: silicone layer
36-μm PET film
permanent adhesive
printable layer: 70 g/m$^2$ laser and inkjet compatible material having a Sheffield roughness (ISO/DIN 8791-3) of 85 units.

An A4 sheet is produced using the structure indicated above. Detachment lines (18) are applied to the printable layer (16) so as to produce two partial areas (19) (labels) that are 150 mm×100 mm in size. Detachment lines (20) are also applied to the transparent film, thereby obtaining two partial areas (21) 180 mm×130 mm in size. A laminated sign 150 mm×100 mm in size can be produced therefrom. The backing film (10) juts out by 15 mm all around the printable label.

Of course, any one of numerous other formats can be produced as well.

A structure for photograph labels preferably comprises layers in the following sequence:

transparent film: 50-μm PET film
permanent repositionable adhesive, coated all over
silicone layer
36-μm PET film
permanent adhesive
printable area: 90 g/m$^2$ inkjet-coated paper having a Sheffield roughness (ISO/DIN 8791-3) of 40 units.

An A4 sheet is produced using the structure indicated above. Detachment lines (18) are applied to the printable layer (16) so as to produce two partial areas (19) (labels) that are 150 mm×100 mm in size. Detachment lines (20) are also applied to the transparent film, thereby obtaining two partial areas (21) 180 mm×130 mm in size. A laminated sign 150 mm×100 mm in size can be produced therefrom. The backing film (10) juts out by 15 mm all around the printable label.

Of course, any one of numerous other formats can be produced as well.

The label sheets discussed herein can be used, for example, to make signs or photographic labels or any of numerous other label types.

I claim:

1. A method of making a label, the method comprising the steps of:

providing a label sheet comprising:

a transparent film support material having an inner surface and an outer surface, a pressure-sensitive adhesive layer disposed over the transparent film support material inner surface, a release layer disposed over the pressure-sensitive adhesive layer, a printable layer disposed over the pressure-sensitive adhesive layer, the printable layer having an inner surface facing the release layer and an opposing outer surface, the outer surface exhibiting a roughness of 4 μm to 50 μm (DIN 4768), one or more first detachment lines extending from the printable layer outer surface and through the printable layer and the release layer, to thereby form a first sub-region, and one or more second detachment lines extending from the transparent film support material outer surface and through the transparent film support material and the pressure-sensitive adhesive layer, to thereby form a second sub-region that is larger than the first sub-region;

separating the first sub-region from the label sheet;

coupling the separated first sub-region to the second sub-region, such that the pressure-sensitive adhesive layer is disposed over the printable layer outer surface; and separating the coupled first and second sub-regions from the label sheet wherein:

the pressure-sensitive adhesive layer defining a first pressure-sensitive adhesive layer;

the label sheet further comprises:

a polyethylene terephthalate (PET) film disposed between the release layer and the printable layer, and a second pressure-sensitive adhesive layer disposed between the PET film and the printable layer;

the one or more first detachment lines extends from the printable layer outer surface and through the printable layer, the second pressure-sensitive adhesive layer, the PET film, and the release layer, to thereby form the first sub-region; and the coupling step includes coupling the separated first sub-region to the second sub-region, such that the first pressure-sensitive adhesive layer is disposed over the printable layer's outer surface.

2. The method of claim 1, wherein:

the label sheet includes one or more edges; and the one or more second lines of detachment are defined by the one or more edges of the label sheet.

3. The method of claim 1, wherein one or both of the transparent film support material or the pressure-sensitive adhesive layer comprise a light-absorbing component.

4. The method of claim 1, wherein the printable layer outer surface exhibits a roughness of 10 μm to 25 μm.

5. The method of claim 1, wherein the first pressure-sensitive adhesive layer is disposed in a pattern form that defines adhesive-free channels.

6. The method of claim 5, wherein:

the label sheet includes one or more edges; and the adhesive-free channels extend to the one or more edges.

7. A method of making a label sheet, the method comprising the steps of:

providing a sheet comprising:

a printable layer having a first surface and a second surface, a release layer disposed on the printable layer's first surface, a transparent film, and a pressure-sensitive adhesive layer disposed on the transparent film, the pressure-sensitive adhesive layer releasably adhering the transparent film to the release layer;

forming at least one first detachment line through the printable layer and the release layer to define a first partial area that includes a portion of the printable layer; and forming at least one second detachment line through the transparent film and the pressure-sensitive adhesive layer to define a second partial area that includes a portion of the pressure-sensitive adhesive layer;

wherein:

the second partial area is larger than the first partial area, the first partial area is configured to be separated from the label sheet and affixed to the second partial area, with the portion of the printable layer of the first partial area directly adjoining the portion of the pressure-sensitive layer of the second partial area, and at least one of the printable layer and the pressure-sensitive adhesive layer is configured to facilitate the removal of unwanted air pockets from the affixed first partial area and the second partial area wherein:

the pressure-sensitive adhesive layer defines a first pressure-sensitive adhesive layer; the sheet further comprises:

a polyethylene terephthalate (PET) film between the printable layer and the release layer, and a second pressure-sensitive adhesive layer between the PET film and the printable layer; and the step of forming the at least one first detachment line results in the at least one first detachment line extending through the printable layer, the second pressure-sensitive adhesive layer, the PET film, and the release layer, and the at least one first detachment line defines a first partial area that includes a portion of the printable layer.

8. The method of claim 7, wherein the pressure-sensitive adhesive layer is in the shape of a pattern.

9. The method of claim 7, wherein the second surface of the printable layer exhibits a roughness of 4 μm to 50 μm (DIN 4768).

10. The method of claim 7, wherein:

the label sheet includes edges; and the at least one second detachment line corresponds to an edge of the label sheet.

* * * * *